US 11,416,643 B2

(12) United States Patent
Daly et al.

(10) Patent No.: US 11,416,643 B2
(45) Date of Patent: Aug. 16, 2022

(54) SMOKE DETECTION SYSTEM LAYOUT DESIGN (71) Applicant: Kidde Technologies, Inc., Wilson, NC (US)

(72) Inventors: Amanda J. Daly, Cary, NC (US); May L. Corn, Manchester, CT (US); Kalyana Gottiparthi, Ellington, CT (US); Vaidyanathan Sankaran, Ellington, CT (US); Changmin Cao, Shanghai (CN); Terry Simpson, Wake Forest, NC (US); Kenneth Bell, Epsom (GB); Ke Wang, Shanghai (CN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 341 days.

(21) Appl. No.: 16/518,534

(22) Filed: Jul. 22, 2019

(65) Prior Publication Data
US 2021/0026927 A1 Jan. 28, 2021

(51) Int. Cl.
*G06F 30/13* (2020.01)
*G08B 17/10* (2006.01)
*G06F 111/10* (2020.01)

(52) U.S. Cl.
CPC .......... *G06F 30/13* (2020.01); *G08B 17/10* (2013.01); *G06F 2111/10* (2020.01)

(58) Field of Classification Search
None
See application file for complete search history.

(56) References Cited

U.S. PATENT DOCUMENTS

| 2003/0040815 | A1* | 2/2003 | Pavlidis | G06F 3/005 |
| | | | | 700/48 |
| 2007/0024459 | A1* | 2/2007 | Cole | G01N 21/53 |
| | | | | 340/630 |
| 2010/0268519 | A1* | 10/2010 | Henning | G01N 33/0075 |
| | | | | 703/6 |

FOREIGN PATENT DOCUMENTS

| CN | 104657810 A | 5/2015 |
| CN | 105787677 A | 7/2016 |
| WO | 2018236530 A1 | 12/2018 |

(Continued)

OTHER PUBLICATIONS

Chu et al., "Uncertainty Analysis 1-15 on Number of Fatalities in Building Fires," Industrial Engineering and Engineering Management, IEEE, Dec. 6, 2011, pp. 1902-1906.

(Continued)

*Primary Examiner* — Craig C Dorais
(74) *Attorney, Agent, or Firm* — Cantor Colburn LLP (57) ABSTRACT Provided are embodiments for a system for designing a layout for a smoke detection system, the system include a storage medium, the storage medium being coupled to a computing engine. The computing engine is configured to receive one or more inputs, model transport and dispersion of smoke in an environment based on the one or more inputs, wherein the model is based on a computational fluid dynamics (CFD) function, and detect the smoke using a plurality of probes. The computing engine is also configured to define a layout of the smoke detectors based on the smoke detectors being able to detect the smoke in the environment, and provide a map of the smoke detectors for the layout. Also provided are embodiments for a method to design a layout for a smoke detection system.

16 Claims, 5 Drawing Sheets (56) References Cited

FOREIGN PATENT DOCUMENTS

WO    2019018590 A1    1/2019

OTHER PUBLICATIONS

Domino et al., "Development of a Smoke Transport Model to Enhance the Certification Process for Cargo Bay Smoke Detection Systems," Proceedings of the 7th Int. Symposium, Int. Assoc. for Fire Safety Science, Jan. 1, 2003, pp. 175-186.
European Search Report; European Application No. 19212813.0; Application Filed: Dec. 2, 2019; Report dated Jul. 3, 2020, 17 pages.
Jiang et al., "Integrated CFD Models for Air-Sampling Smoke Detection," SUPDET 2009 Research Applications, Feb. 24-27, 2009, pp. 1-9.
Mcgrattan et al., "NIST Special Publication 1019-5 Fire Dynamics Simulator (Version 5) User's Guide," National Institute of Standards and Technology, Oct. 1, 2007, 206 pages.

\* cited by examiner

SMOKE DETECTION SYSTEM LAYOUT DESIGN

BACKGROUND

The present invention generally relates to smoke detection systems, and more specifically to techniques for designing smoke detection system layouts.

Smoke detection systems are used in a wide range of spaces to provide protection against smoke and fire damage for a defined space. The spaces can include various structures including office buildings, warehouses, or residential homes. In addition, various vehicles such as aircraft, cruise ships, buses, etc. can include smoke detection systems. The types, number, and placement of the smoke detectors and sensors can change based on its application. For some applications, after the smoke detection system is designed the design must be certified prior to using the system in the field. There may be a need to efficiently design the layout for a smoke detection system.

BRIEF DESCRIPTION

According to an embodiment, a method to design a layout for a smoke detection system. The method includes receiving one or more inputs; modeling transport and dispersion of smoke in an environment based on the one or more inputs, wherein the model is based on a computational fluid dynamics (CFD) function; and detecting the smoke using a plurality of probes. The method also includes defining a layout of the smoke detectors based on the smoke detectors being able to detect the smoke in the environment, and providing a map of the smoke detectors for the layout.

In addition to one or more of the features described herein, or as an alternative, further embodiments include a defined layout of the smoke detectors that provide a maximum coverage over the environment while utilizing a minimum number of smoke detectors.

In addition to one or more of the features described herein, or as an alternative, further embodiments include providing an alternative layout of the smoke detectors that adds an additional smoke detector.

In addition to one or more of the features described herein, or as an alternative, further embodiments include validating the defined layout; and re-performing a number of tests using the defined layout to determine an alarm time and a confidence interval for the defined layout.

In addition to one or more of the features described herein, or as an alternative, further embodiments include an environment that includes at least one of a cargo bay, electronics bay, avionics cooling space, or lavatory.

In addition to one or more of the features described herein, or as an alternative, further embodiments include a CFD function that computes the model based on a smoke detector type and the detection system layout.

In addition to one or more of the features described herein, or as an alternative, further embodiments include a CFD function that computes the model based at least in part on a geometry and contents of the environment.

In addition to one or more of the features described herein, or as an alternative, further embodiments include a CFD function that computes the model based at least in part on an ambient temperature, pressure, or ventilation schedule of the environment.

In addition to one or more of the features described herein, or as an alternative, further embodiments include a CFD function that computes the model based on a smoke output and location of a smoke source.

In addition to one or more of the features described herein, or as an alternative, further embodiments include a smoke output is modeled based at least in part on at least one of a concentration, velocity, temperature, or particle size distribution of the smoke.

According to another embodiment, a system for designing a layout for a smoke detection system is provided. The system includes a storage medium, the storage medium being coupled to a computing engine. The computing engine is configured to receive one or more inputs; model transport and dispersion of smoke in an environment based on the one or more inputs, wherein the model is based on a computational fluid dynamics (CFD) function; and detect the smoke using a plurality of probes. The computing engine is also configured to define a layout of the smoke detectors based on the smoke detectors being able to detect the smoke in the environment; and provide a map of the smoke detectors for the layout.

In addition to one or more of the features described herein, or as an alternative, further embodiments include a defined layout of the smoke detectors provide a maximum coverage over the environment while utilizing a minimum number of smoke detectors.

In addition to one or more of the features described herein, or as an alternative, further embodiments include a computing engine that is configured to provide an alternative layout of the smoke detectors that adds an additional smoke detector.

In addition to one or more of the features described herein, or as an alternative, further embodiments include a computing engine is configured to validate the defined layout; and re-perform a number of tests using the defined layout to determine an alarm time and a confidence interval for the defined layout.

In addition to one or more of the features described herein, or as an alternative, further embodiments include an environment that includes at least one of a cargo bay, electronics bay, avionics cooling space, or lavatory.

In addition to one or more of the features described herein, or as an alternative, further embodiments include a computing engine that is configured to compute the CFD function of the model based on a smoke detector type and the detection system layout.

In addition to one or more of the features described herein, or as an alternative, further embodiments include a computing engine that is configured to computes the CFD function of the model based at least in part on a geometry and contents of the environment.

In addition to one or more of the features described herein, or as an alternative, further embodiments include a computing engine that is configured to compute the CFD function of the model based at least in part on an ambient temperature, pressure, or ventilation schedule of the environment.

In addition to one or more of the features described herein, or as an alternative, further embodiments include a computing engine that is configured to compute the CFD function of the model based on a smoke output and location of a smoke source.

In addition to one or more of the features described herein, or as an alternative, further embodiments include a smoke output that is modeled based at least in part on at least one of a concentration, velocity, temperature, or particle size distribution of the smoke Technical effects of embodiments of the present disclosure include determining an optimal layout for a smoke detection system. The techniques described herein can model smoke from various smoke sources to determine the layout of smoke detectors in an environment. The techniques described herein can provide a layout without having an initial plan.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

The process of designing a new smoke detection system layout on an aircraft can involve iterative tests that start with layouts based on past experience. This process can be time-consuming and may not consider layouts that can perform better or that can save costs by utilizing a fewer number of detectors. Currently, there are no known modeling toolsets that can design certifiable smoke detection layouts.

The techniques described herein provide a tool that identifies candidate smoke detection system layouts using computational fluid dynamics (CFD) coupled with uncertainty quantification. In addition, several input conditions and environmental parameters are varied and monitored to determine within a particular confidence level of how the smoke detection system will perform. CFD is a discipline within fluid dynamics that uses numerical analysis and data structures to model fluid flow. CFD can be used in a range of applications including but not limited to aerodynamics, combustion, weather simulation, multi-phase flows generally, etc. The types of fluid, fuel, boundaries, and other factors are input into the model to simulate a depiction of the fluid flow.

The CFD simulation is instrumented with hundreds of CFD probes at the ceiling of a structure to determine how the smoke will be transported, dispersed, and detected during a fire or a smoke causing event. The data from the CFD probes from multiple simulations with varying inputs can be used to determine a placement for one or more smoke detectors. In one or more embodiments, an initial system layout does not have to be defined. The computing engine is configured to determine a layout of the smoke detectors by performing the analysis in the environment. After the locations for the one or more smoke detectors have been selected, additional scenarios can be tested using the determined layout to determine whether it is likely the layout will pass a certification test. The probability of success and a confidence level can be provided for the determined layout.

Figure 1:
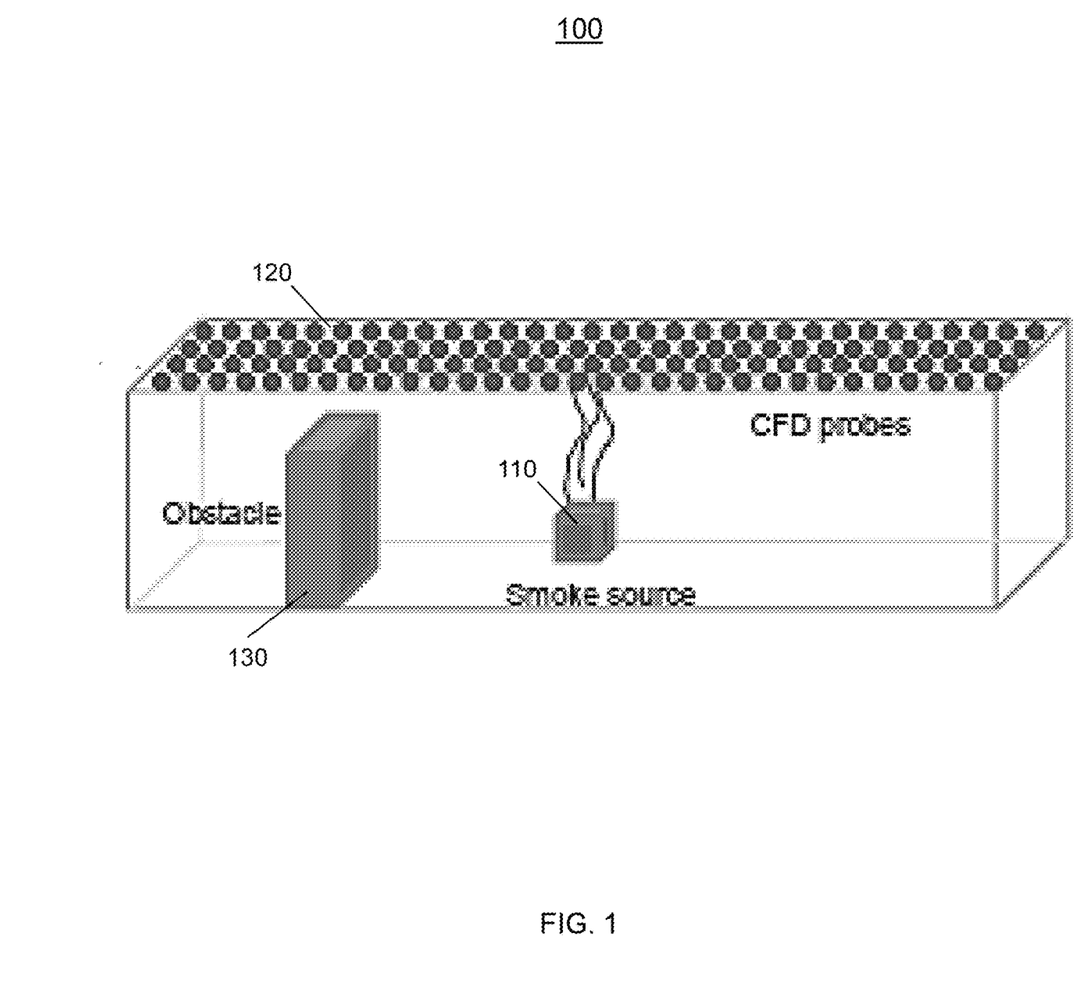
FIG. 1 depicts a simulation for designing a layout of a smoke detection system in accordance with one or more embodiments.

FIG. 1 depicts a simulation for designing a smoke detection system layout in accordance with one or more embodiments. The simulation includes a smoke source 110, a plurality of CFD probes 120 and an obstacle 130. Each of the CFD probes 120 is configured to detect the smoke from smoke source 110 during the simulation. Also, the obstacle 130 can be representative of various obstacles such as wall, curtains or other obstacles. It should be understood the number of obstacles can be designed to be representative of a particular environment.

Figure 2:
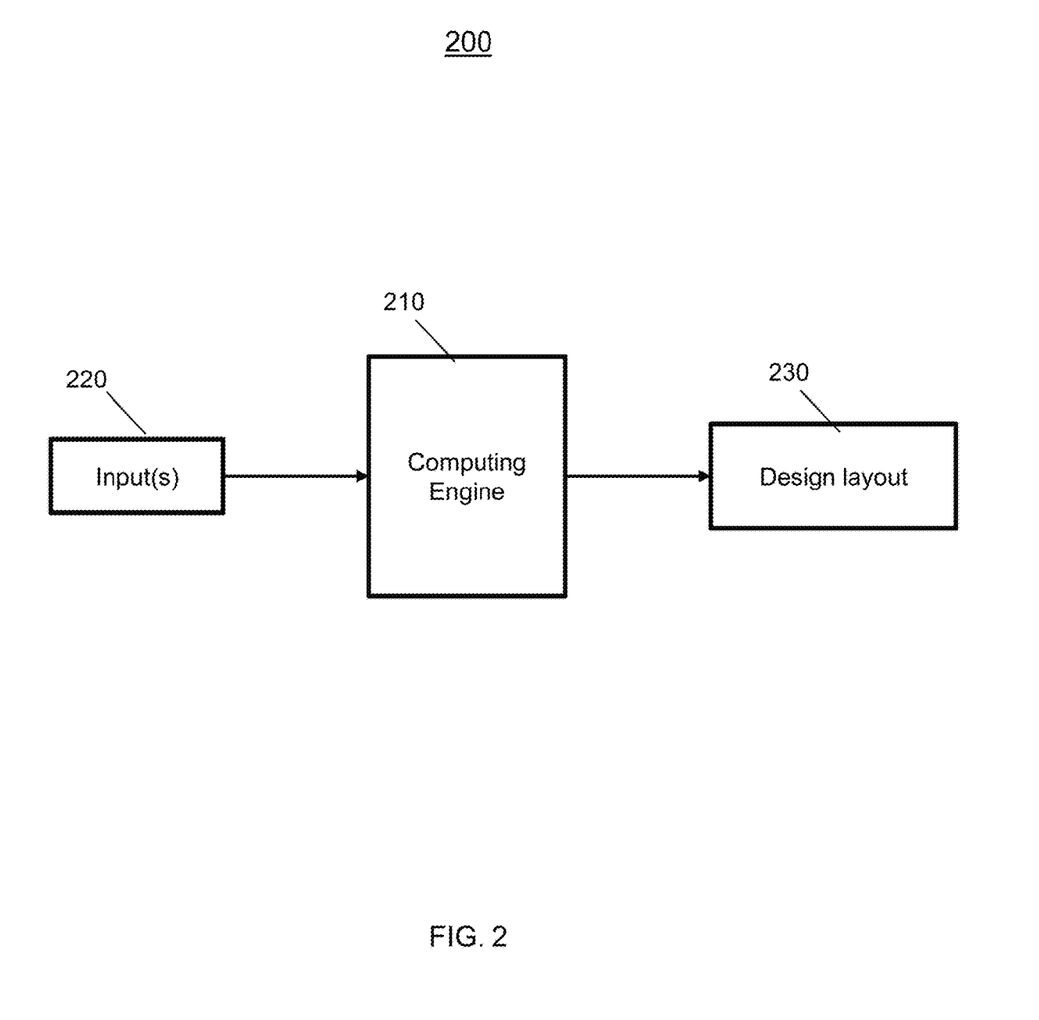
FIG. 2 depicts a system for designing a layout of a smoke detection system in accordance with one or more embodiments.

FIG. 2 depicts system 200 including a computing engine 210 that is configured to design the layout of a smoke detection system. The computing engine 210 is configured to receive input(s) 220 and perform the CFD function on the input to model the behavior of the smoke and the detector response. The input(s) 220 can include is not limited to the geometry of the environment, airflow through the environment, obstructions in the environment, detector type, etc. The output from the computing engine 210 can include the design layout of the smoke detectors in the smoke detection system. In addition, the output can include the alarm time and the confidence interval for the design layout.

The data sets are analyzed with uncertainty quantification techniques to identify additional input conditions to execute in the CFD model and to build up a database that can be post-processed to generate placement maps defined with confidence intervals for different scenarios. In one or more embodiments, an uncertainty quantification analysis is performed to identify additional inputs that should be input into the computing engine.

During the analysis, the smoke source is varied over a range of positions in the environment. The type of smoke source can be modeled to simulate different paths for smoke transport and dispersion. In addition, the effect of air ventilation can be modeled by the computing system. The CFD function is suited to model the simulation according to the inputs and output the detector response. The detector response is provided by the CFD can be used to determine the placement and number of smoke detectors.

CFD probes 120 are provided in the ceiling of a room or any other location where smoke detectors would be installed. The CFD probes are used to model the manner in which the smoke reaches the ceiling. As shown each of the CFD probes can indicate the region or coverage of the smoke from the smoke source 110.

Responsive to acquiring the smoke coverage data, the smoke detectors can be positioned for installation can be determined. The range of detection and the sensitivity of the smoke detectors can be considered by the computing engine. That is, the type of smoke detectors can be input into the computing system. The height of the ceiling in the environment can also be factored into the computing system.

In one or more embodiments, the computing engine 210 is configured to iterate through a number of combinations of the smoke source location and the number and placement of smoke detectors to determine an optimal configuration to provide the desired coverage/protection for the environment.

For a given layout, where the number and placement of the smoke detectors, the ability for the current layout to detect the smoke from the smoke source are tested. In a non-limiting example, the test can include the layout being configured to detect the smoke within an alarm time of one-minute. It should be understood the test can be modified to different alarm times including those that are longer and shorter than the one-minute alarm time. In the event the test fails, the position of the smoke detectors can be varied. If the updated layout continues to fail the test, the number of smoke detectors can be increased.

In one or more embodiments, the simulation provides a region that represents the smoke as it reaches the ceiling of the environment. The region can indicate the intensity of the smoke. For example, a cloud associated with a smoke cloud can be stronger in the center of the cloud while the edges are not as intense. This can correspond to the smoke detectors ability to detect smoke where the smoke detector is likely to detect the intense smoke signals before less intense signals. This information can be used to provide an initial placement of smoke detectors in the layout.

Figure 3A:
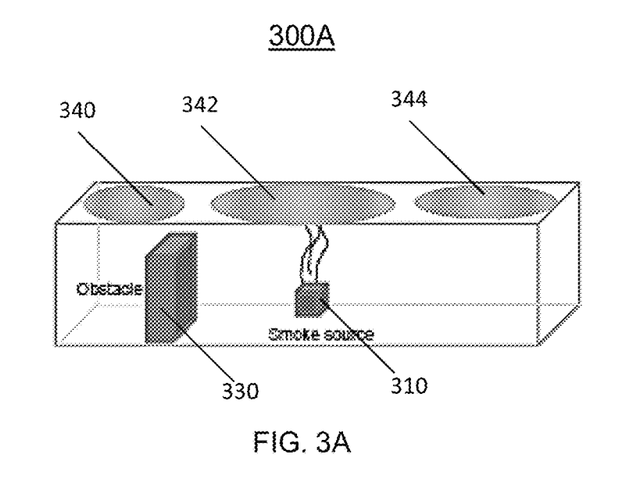
FIG. 3A depicts results of a simulation used in designing a layout in accordance with one or more embodiments.
Figure 3B:
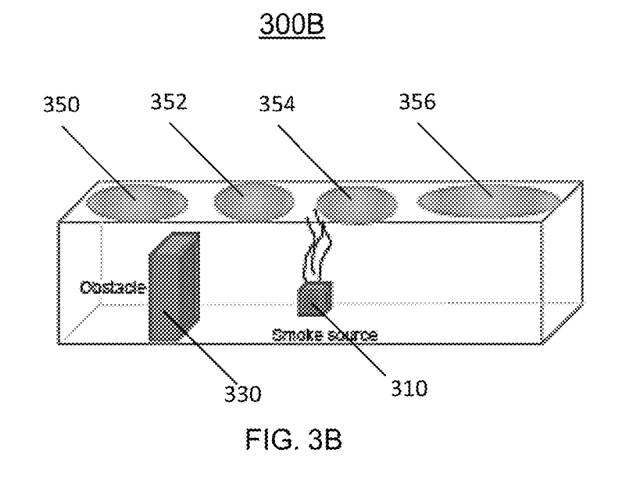
FIG. 3B depicts results of a simulation used in designing a layout in accordance with one or more embodiments.

Now referring to FIG. 3A, an example set of results is displayed. As shown in the system 300A the smoke from the smoke source 310 has been detected by the CFD probes and covers the regions 340, 342, and 344. In this non-limiting example, the region 340 is smaller than 342 because the smoke may be impacted by the obstacle 330. Region 342 is above the smoke source 310 so the region 342 can cover a wide range. Region 346 is a distance away from the smoke source 310 and may take longer to detect the smoke. Each of the regions 340, 342, and 344 can provide intensity information where the center detects a stronger smoke signal when compared to the edges. Using this information, the smoke detectors can be positioned based on the regions 340, 342, and 344. In this example, the three smoke detectors can be mapped to each of the regions 340, 342, and 344. In another example, FIG. 3B depicts another system 300B where four smoke detectors can be mapped to the detected regions 350, 352, 354, and 356.

After the mapping or layout of smoke detectors are determined, the computing system 210 can validate the system by performing a number of simulations using the layout to determine the probability that the smoke will be detected within the alarm time and a confidence interval for the layout and alarm time.

Figure 4:
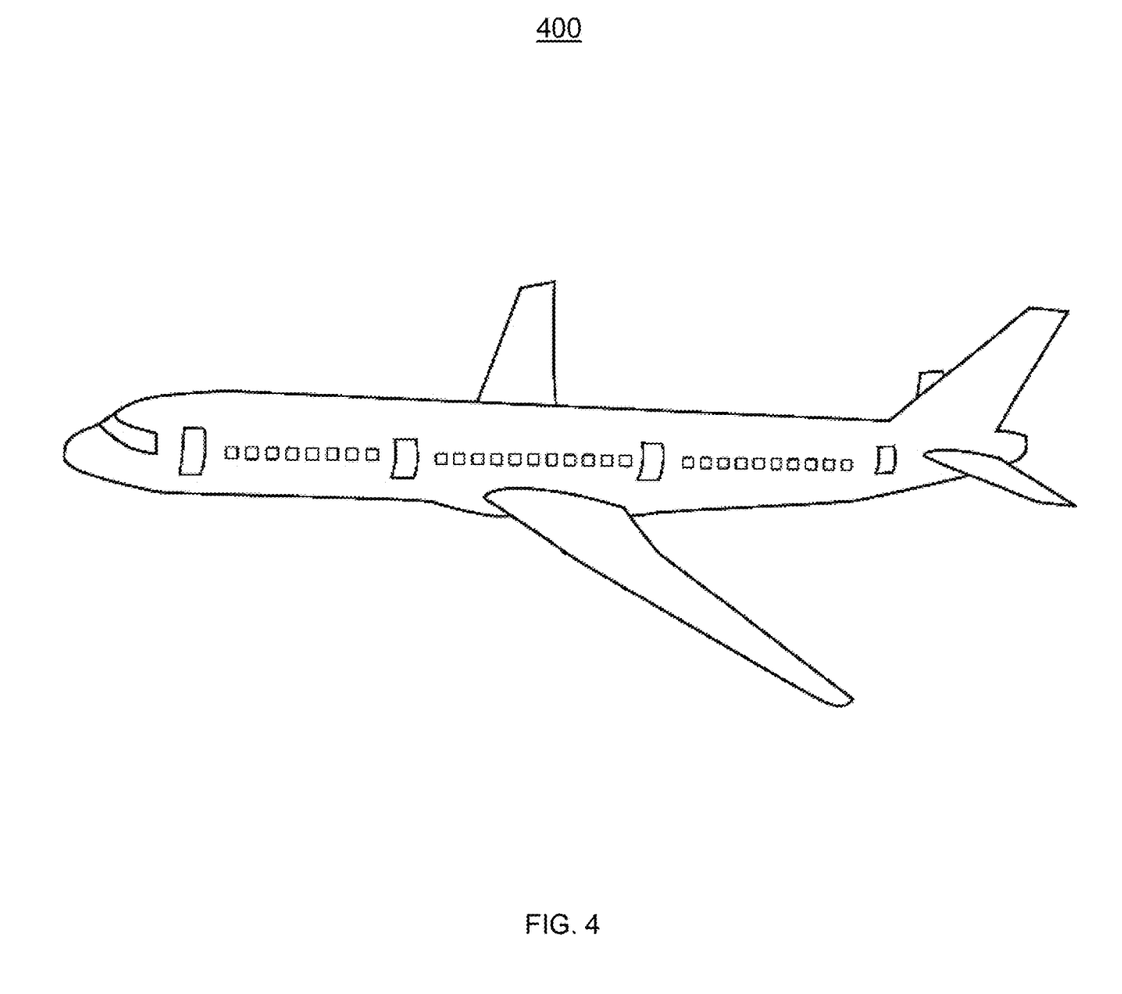
FIG. 4 depicts an aircraft in accordance with one or more embodiments.

FIG. 4 depicts an aircraft 400 upon which the smoke detection system can be designed. In a non-limiting example, the computing engine 210 can be configured to simulate a certification for the aircraft to determine the probability and confidence that the smoke detection system will detect the smoke in time. It should be understood that smoke detection systems for other environments can be simulated by the computing engine.

Figure 5:
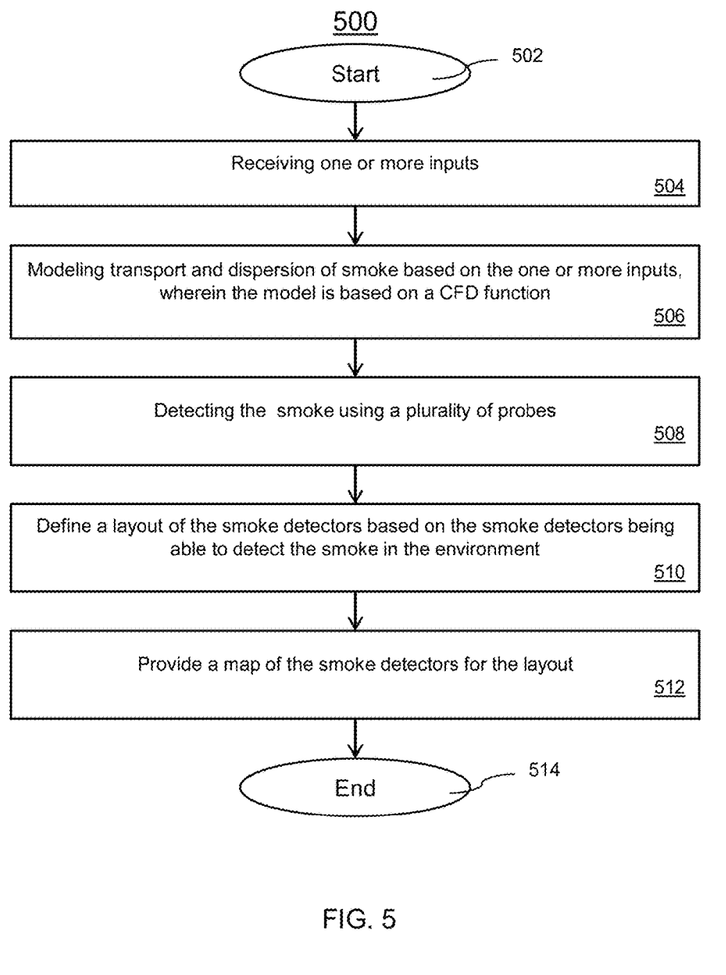
FIG. 5 depicts a flowchart of a method for designing a layout of a smoke detection system in accordance with one or more embodiments.

FIG. 5 depicts a method 500 for designing a layout of a smoke detection system in accordance with one or more embodiments. The method 500 can be implemented in a system such as that shown in FIG. 2 or any other computing system environment. The method 500 begins at block 502 and continues to block 504 which provides for receiving one or more inputs.

Block 506 models transport and dispersion of smoke based on the one or more inputs, wherein the model is based on a CFD function. For example, the input can include fire type such as a fire having a source such as an electrical, fuel, metal, etc. source. In addition, the input can also include a ventilation pattern in the environment that can directly impact the transport of smoke from the source to the ceiling. Various obstructions and objects can be included and modeled by the CFD function. Block 508 detects the smoke using a plurality of probes. The probes are modeled as being in the ceiling or other locations where the smoke detectors are likely to be installed.

Block 510 defines a layout of the smoke detectors based on the smoke detectors being able to detect the smoke in the environment. A region in which at least one smoke detector can detect smoke within a confidence interval is identified based on the CFD probe alarming within the desired time limit. In one or more embodiments, the layout of the placement of the one or more smoke detectors is tested and iterated through a plurality of simulations to compute a confidence level for an alarm time probability. Once the smoke detection system layout is derived for the specific configuration the system runs additional simulations where each additional simulation factors other operational/installation parameters such as the smoke source location, flight conditions, etc. Each of the additional smoke detection system layouts recommended by the simulation are compared with each other to create a smoke detection system layout that operates robustly and is designed to pass the certification test at a higher confidence level.

Block 512 provides a map of the one or more smoke detectors for the layout with a confidence interval. The confidence interval indicates the confidence that the determine layout will pass the certification. The method 500 ends at block 514.

The technical effects and benefits include identifying an optimal number of detectors required to protect a space and providing flexible placement options for the detection system. In addition, the technical effects and benefits include providing a design for an undefined space.

A detailed description of one or more embodiments of the disclosed apparatus and method are presented herein by way of exemplification and not limitation with reference to the Figures.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method designing a layout for a smoke detection system, the method comprising:
    receiving one or more inputs;
    modeling transport and dispersion of smoke in an environment based on the one or more inputs, wherein the one or more inputs comprise a ventilation schedule of the environment, wherein the model is based on a computational fluid dynamics (CFD) function;
    detecting the smoke using a plurality of probes;
    defining a layout of the smoke detectors based on the smoke detectors being able to detect the smoke in the environment within a specified time frame;
    validating the defined layout;
    re-performing a number of tests using the defined layout to determine an alarm time and a confidence interval for the defined layout, wherein the defined layout of the smoke detectors provide a maximum coverage over the environment while utilizing a minimum number of smoke detectors for detecting smoke; and
    providing the confidence interval and a map of the smoke detectors for the layout.

2. The method of claim 1, further comprising providing an alternative layout of the smoke detectors that adds an additional smoke detector.

3. The method of claim 1, wherein the environment comprises at least one of a cargo bay, electronics bay, avionics cooling space, or lavatory.

4. The method of claim 1, wherein the CFD function computes the model based on a smoke detector type and the detection system layout.

5. The method of claim 1, wherein the CFD function computes the model based at least in part on a geometry and contents of the environment.

6. The method of claim 1, wherein the CFD function computes the model based at least in part on an ambient temperature, or pressure.

7. The method of claim 1, wherein the CFD function computes the model based on a smoke output and location of a smoke source.

8. The method of claim 7, wherein the smoke output is modeled based at least in part on a concentration, velocity, temperature, or particle size distribution of the smoke.

9. A system for designing a layout for a smoke detection system, the system comprising:
    a storage medium, the storage medium being coupled to a processor;
    the computing engine configured to:
        receive one or more inputs;
        model transport and dispersion of smoke in an environment based on the one or more inputs, wherein the one or more inputs comprise a ventilation schedule of the environment, wherein the model is based on a computational fluid dynamics (CFD) function;
        detect the smoke using a plurality of probes;
        define a layout of the smoke detectors based on the smoke detectors being able to detect the smoke in the environment;
        validate the defined layout;
        re-perform a number of tests using the defined layout to determine an alarm time and a confidence interval for the defined layout, wherein the defined layout of the smoke detectors provide a maximum coverage over the environment while utilizing a minimum number of smoke detectors for detecting smoke; and
        provide the confidence interval and a map of the smoke detectors for the layout.

10. The system of claim 9, wherein the computing engine is configured to provide an alternative layout of the smoke detectors that adds an additional smoke detector.

11. The system of claim 9, wherein the environment comprises at least one of a cargo bay, electronics bay, avionics cooling space, or lavatory.

12. The system of claim 9, wherein the computing engine is configured to compute the CFD function of the model based on a smoke detector type and the detection system layout.

13. The system of claim 9, wherein the computing engine is configured to computes the CFD function of the model based at least in part on a geometry and contents of the environment.

14. The system of claim 9, wherein the computing engine is configured to compute the CFD function of the model based at least in part on an ambient temperature, or pressure.

15. The system of claim 9, wherein the computing engine is configured to compute the CFD function of the model based on a smoke output and location of a smoke source.

16. The system of claim 15, wherein the smoke output is modeled based at least in part on concentration, velocity, temperature, or particle size distribution of the smoke.

* * * * *